US009751250B2

(12) United States Patent
Lewin et al.

(10) Patent No.: US 9,751,250 B2
(45) Date of Patent: Sep. 5, 2017

(54) DEVICE FOR HEATING PREFORMS CONSISTING OF THERMOPLASTIC MATERIAL

(71) Applicant: KHS Corpoplast GmbH, Hamburg (DE)

(72) Inventors: Frank Lewin, Tangstedt (DE); Michael Linke, Hamburg (DE); Deniz Ulutürk, Hamburg (DE)

(73) Assignee: KHS CORPOPLAST GMBH, Hamburg (DE)

( * ) Notice: Subject to any disclaimer, the term of this patent is extended or adjusted under 35 U.S.C. 154(b) by 140 days.

(21) Appl. No.: 14/900,583

(22) PCT Filed: Jun. 27, 2014

(86) PCT No.: PCT/EP2014/001759
§ 371 (c)(1),
(2) Date: Dec. 21, 2015

(87) PCT Pub. No.: WO2014/206569
PCT Pub. Date: Dec. 31, 2014

(65) Prior Publication Data
US 2016/0144552 A1    May 26, 2016

(30) Foreign Application Priority Data
Jun. 27, 2013  (DE) .................. 10 2013 010 693

(51) Int. Cl.
*B29C 49/68* (2006.01)
*B29B 13/02* (2006.01)
(Continued)

(52) U.S. Cl.
CPC ............ *B29C 49/68* (2013.01); *B29B 13/024* (2013.01); *B29C 35/0805* (2013.01);
(Continued)

(58) Field of Classification Search
CPC . B29C 49/68; B29C 2035/0822; B29C 49/06; B29C 49/6409; B29C 49/6418; B29C 35/0805
See application file for complete search history.

(56) References Cited

U.S. PATENT DOCUMENTS 3,418,398 A * 12/1968 See Luth ............ B29C 49/6418
  425/533
4,846,656 A *  7/1989 Denis .................. B29C 49/6409
  264/908
(Continued)

FOREIGN PATENT DOCUMENTS

DE    202004010454 U1    9/2004
DE    102009033902 A1    1/2011
(Continued)

*Primary Examiner* — Gregory A Wilson
(74) *Attorney, Agent, or Firm* — Lucas & Mercanti, LLP; Klaus P. Stoffel

(57) ABSTRACT

A device for heating thermoplastic preforms, including a heating channel formed from a heating module and through which the regions of the preforms to be heated are guided by a conveyor device. Radiant heaters are arranged on a side wall of the heating channel. In the region of a side that lies opposite the radiant heaters and/or the base of the heating channel, reflector elements which act as counter or base reflectors are arranged. The reflector has a reflection layer and a carrier layer. The reflection layer includes a material with a silicon dioxide base and an IR reflection value greater than 90% in the range of 500 to 2500 nm. The carrier layer is a material with greater mechanical strength than the reflection layer and is used as a carrier for the reflection layer. Both layers have a similar coefficient of thermal expansion and are permanently interconnected.

10 Claims, 2 Drawing Sheets

(51) Int. Cl.
 B29C 49/64 (2006.01)
 B29C 35/08 (2006.01)
 B29C 49/06 (2006.01)
(52) U.S. Cl.
 CPC .......... B29C 49/6418 (2013.01); *B29C 49/06* (2013.01); *B29C 2035/0822* (2013.01)

(56) References Cited

U.S. PATENT DOCUMENTS

| | | | | |
|---|---|---|---|---|
| 5,207,505 A * | 5/1993 | Naraki | ............ | F21V 7/22 |
| | | | | 362/294 |
| 5,310,980 A * | 5/1994 | Beckett | ............ | A47J 36/04 |
| | | | | 219/709 |
| 8,662,872 B2 * | 3/2014 | Quetel | ............ | B29B 13/025 |
| | | | | 425/210 |
| 8,729,431 B2 * | 5/2014 | Winzinger | ............ | B29B 13/024 |
| | | | | 219/388 |
| 9,084,293 B2 | 7/2015 | Schoenberger et al. | | |
| 2005/0249902 A1 * | 11/2005 | Lynch | ............ | B29C 43/18 |
| | | | | 428/35.7 |
| 2006/0204607 A1 * | 9/2006 | Neter | ............ | B29C 45/7207 |
| | | | | 425/547 |
| 2006/0204608 A1 * | 9/2006 | Neter | ............ | B29C 35/16 |
| | | | | 425/547 |
| 2012/0267832 A1 | 10/2012 | Zocher et al. | | |
| 2012/0269918 A1 | 10/2012 | Winzinger et al. | | |

FOREIGN PATENT DOCUMENTS

DE 102009047540 A1 6/2011
EP 2444234 A2 4/2012

* cited by examiner

DEVICE FOR HEATING PREFORMS CONSISTING OF THERMOPLASTIC MATERIAL

The present application is a 371 of International application PCT/EP2014/001759, filed Jun. 27, 2014, which claims priority of DE 10 2013 010 693.1, filed Jun. 27, 2013, the priority of these applications is hereby claimed and these applications are incorporated herein by reference.

BACKGROUND OF THE INVENTION

The invention pertains to a device for heating preforms consisting of thermoplastic material.

Devices of the class in question are usually provided in stretch blow-molding machines. They serve to heat the plastic preforms consisting of, for example, polyethylene terephthalate (PET), from which, after the heating step, the desired plastic containers are produced by blow-molding.

As a rule, devices of the class in question comprise an endless conveying device, to which the preforms are supplied by a star wheel feeder. So that the preforms can be thermally conditioned, the conveying device then conveys them through a heating channel extending over a defined section of the transport route. The preforms or the parts of the preforms which extend into the heating channel are heated to temperatures above the glass transition temperature of the material to be processed.

Other types of devices are also known, of course, such as those in which the preforms are stationary while being heated.

In devices of the class in question, the heating channel can be formed by, for example, at least one heating module; or, when the preforms are heated while in motion, it is usually formed by several heating modules connected to each other in the transport direction, each of which forms one section of the heating channel. Heating modules of this type are described in, for example, DE 10 2009 033 902.

Known heating modules are formed by heating channel sections with an essentially closed radiation space. Heating elements, usually horizontally oriented heat radiators, which emit infrared radiation with a maximum radiation intensity in the range of 800-1500 nm, are arranged on one side of the heating channel. A reflector (primary reflector) provided on this side, behind the heating elements, ensures that radiation emitted by the heating elements toward the rear is reflected back into the heating channel. Reflector elements (counter-reflector and base reflector) are provided on the opposite side wall and on the floor of the radiation space to minimize the heat loss in the heating channel section.

The counter-reflector and base reflector are, for example, polished and/or coated metal elements arranged on the wall and floor, respectively; to withstand the vibrations, etc, which occur during operation in the known machines, they are made with an appropriate degree of mechanical strength.

The problem, however, is that these metal mirrors do not offer optimal reflective properties, which can lead in particular to energy losses and to an undesirable heating of the elements. Dirt on the mirrors and the associated cleaning processes, furthermore, lead to a further deterioration of the reflective properties as a result of scratches, etc.

As an alternative, ceramic elements are known, which have the necessary strength to withstand the mechanical stresses, and which can therefore be used for the counter-reflectors and base reflectors. Such ceramic materials, however, have a comparatively low reflection coefficient.

Ceramic materials which consist primarily of amorphous silicon dioxide and which have a very good diffuse reflectivity, i.e., a comparatively high reflection coefficient, are also known. Such materials, however, suffer from the disadvantage that they have comparatively low mechanical strength and can easily suffer damage during installation or during operation.

SUMMARY OF THE INVENTION

The goal of the invention is therefore to create a device in which counter-reflectors and/or base reflectors comprise both good reflection properties and adequate mechanical strength in comparison to the prior art.

It is provided accordingly that the reflector elements provided in the counter-reflectors and/or base reflectors are built from two different layers.

A reflective layer serves primarily to reflect, whereas an adjacent carrier layer serves as a support for the reflection layer.

The term "layer", to the extent used in this application, is intended to include, in particular, elements configured as two-dimensional molded parts, which, after appropriate conditioning, are arranged on top of each other and then form the reflective and carrier layers. It also comprises, however, a reflective layer which is applied to the carrier layer by spraying or dipping, for example.

It is also provided according to the invention that the reflective layer is made of a reflective silicon dioxide material; when the preferred material is used, the silicon dioxide accounts for more than 95%, in an especially preferred embodiment, more than 99% of the total.

A suitable material for the reflective layer is sold by the companies Heraeus and by Saint-Gobain, for example. This is a material which consists of more than 99% pure amorphous silicon dioxide fibers and has an IR reflection value of >90% in the range of 500-2500 nm. The IR reflection properties of materials such as metallic aluminum, aluminum silicate, and calcium silicate with values between 70% and 85% are considerably worse by comparison.

An element preferred for use as a reflective layer within the scope of the invention consists of the above-mentioned material, that is, almost exclusively of amorphous silicon dioxide fibers.

The problem with the above-mentioned materials which can be used according to the invention for the reflective layer is that they have little mechanical strength. Studies by the applicant have shown that, as a result of the vibrations which occur during operation, a reflector element of the above-mentioned material with a large percentage of amorphous silicon dioxide fibers is subjected to a grinding action on direct contact with the walls of the heating module.

This effect can be avoided, as provided according to the invention, by arranging the reflective layer on a carrier layer, serving as a support. Now it is the carrier layer which is in contact with the walls of the heating module, for example; it also gives the reflective layer enough strength, however, that the reflector element comprising the carrier layer and the reflective layer can be arranged in an essentially free-standing manner.

The carrier layer can be made of various materials. The essential point is that the carrier layer must have sufficient mechanical strength and also have thermal properties similar to those of the reflective layer. A layer of quartz glass in particular has the appropriate properties. Also suitable are, for example, layers based on aluminum silicate or calcium silicate. Known suitable materials or molded parts are, for example, commercially obtainable under the brand name "Altraform KVS" molded parts. These are ceramic parts based on polycrystalline wool with an $Al_2O_3$ content of 28-88% and an $SiO_2$ content of 12-20%. The bulk densities are in the range of 300-700 kg/m³. Other products are obtainable under the name "Altraform KVR". Here the $Al_2O_3$ content is 98%, and the $SiO_2$ content is 2%. The bulk densities are in the range of 240-500 kg/m³.

The carrier layer can be in particular an element already used as a reflector in known devices. Essential to the choice of the carrier layer, furthermore, is that, to avoid thermal stresses, it must consist of a material which has a coefficient of thermal expansion similar to that of the reflective layer.

It is also provided according to the invention that the two layers of the reflector element are permanently bonded to each other. The bond can be achieved by means of lamination, for example; that is, the reflective layer can be laminated onto the carrier layer. As an alternative, it is also possible to use an adhesive to bond to two layers together. An adhesive adapted to the purpose is commercially available under the brand name "Fiberfax".

It is also conceivable that the reflective layer could be applied by the wet method, in particular by spraying or dipping, to the carrier layer and then dried and thus permanently bonded to the carrier layer. The liquid preparations necessary for this purpose are also commercially obtainable.

As a rule, it is sufficient for the reflective layer to be thinner than the carrier layer. The reflective layer preferably has no more than half the thickness of the carrier layer.

It has been found that the carrier layer is able to stabilize the reflective layer arranged on it in such a way that the vibrations which occur are no longer able to damage the reflective layer.

The invention will be explained in greater detail below on the basis of two figures:

DETAILED DESCRIPTION OF THE INVENTION

Figure 1:
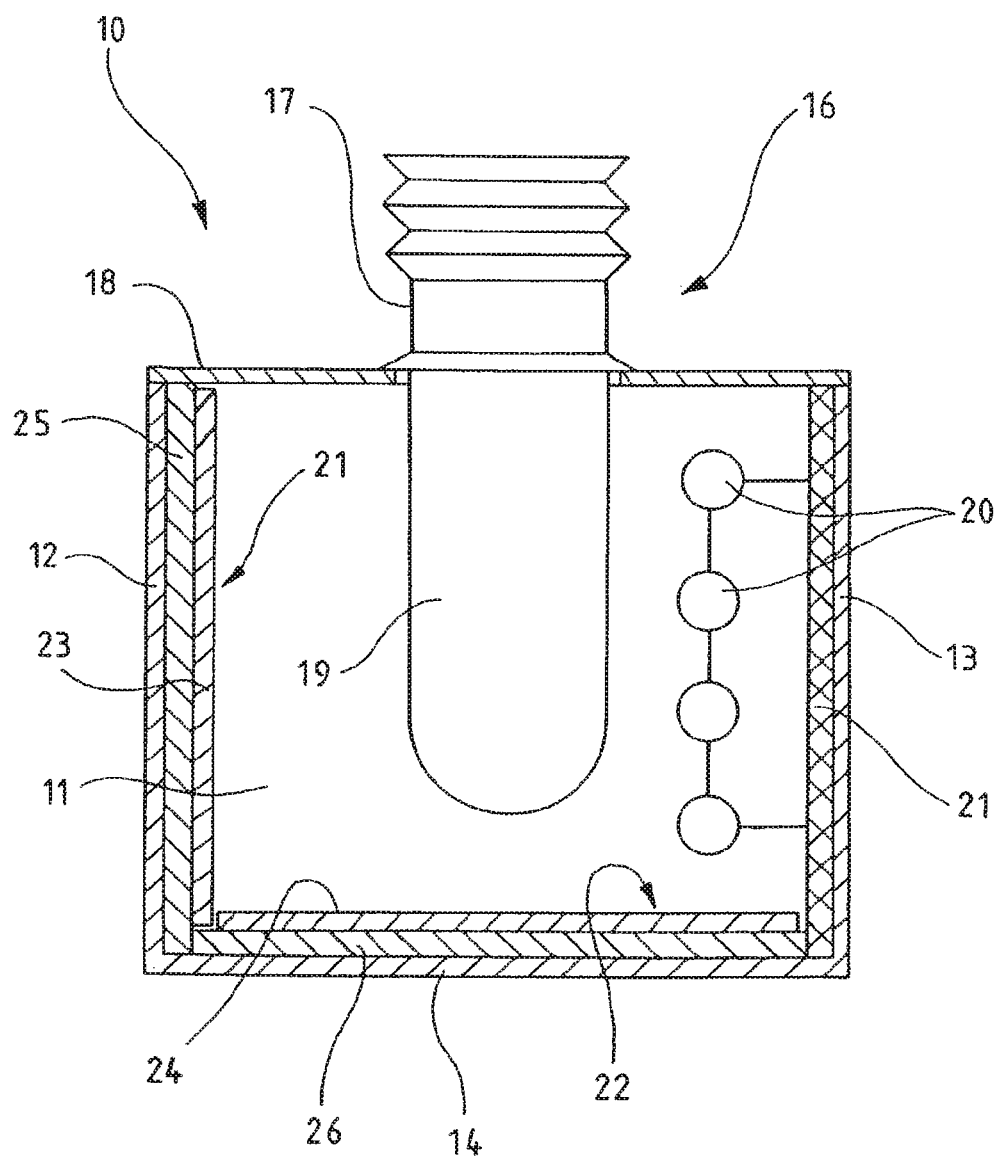
FIG. 1 shows a heating module according to a first embodiment of the invention.

FIG. 1 shows a cross section through a heating module 10, in which a heating channel 11 with a U-shaped profile defined by side walls 12, 13 and a base wall 14 is formed.

A preform 16 is shown in the heating module 10; the preform is held in the area of its neck 17 on the top cover 18 of the heating module, and its lower part 19 to be molded projects into the heating channel 11.

Heating elements 20 are provided in the area of the side wall 13. The heating elements 20 are horizontally oriented heating tubes, which emit radiation preferably in the near-infrared region. A reflector element 21, which can also be called the primary reflector and which can consist of aluminum dioxide, for example, is also arranged on the side wall 13.

In the area of the base wall 14 and the side wall 12, reflector elements 21 and 22 are arranged, which serve as a counter-reflector and a base reflector, respectively.

The reflector elements 21, 22 are built out of two layers 23, 24; 25, 26, consisting of different materials, which can be bonded to each by means of an adhesive or by lamination.

One of the layers is an outer reflective layer 23, 24, facing the heating channel 11; this layer consists of a highly reflective material based on silicon dioxide, but it has relatively little mechanical strength.

To increase its stability, the reflective layer is applied to a carrier layer 25, 26, which fulfills in particular a support function for the reflective layer 23, 24. The carrier layer is preferably quartz glass, but ceramic layers are also conceivable.

The carrier layer is fastened in turn to the side wall 12 or the base wall 14 by means of clamps (not shown), for example, or by other types of retaining elements. There is therefore no direct contact between the reflective layers 23, 24 and the walls 12, 14 of the heating module, and the vibrations which occur during operation do not lead to any friction which could grind away the material.

Figure 2:
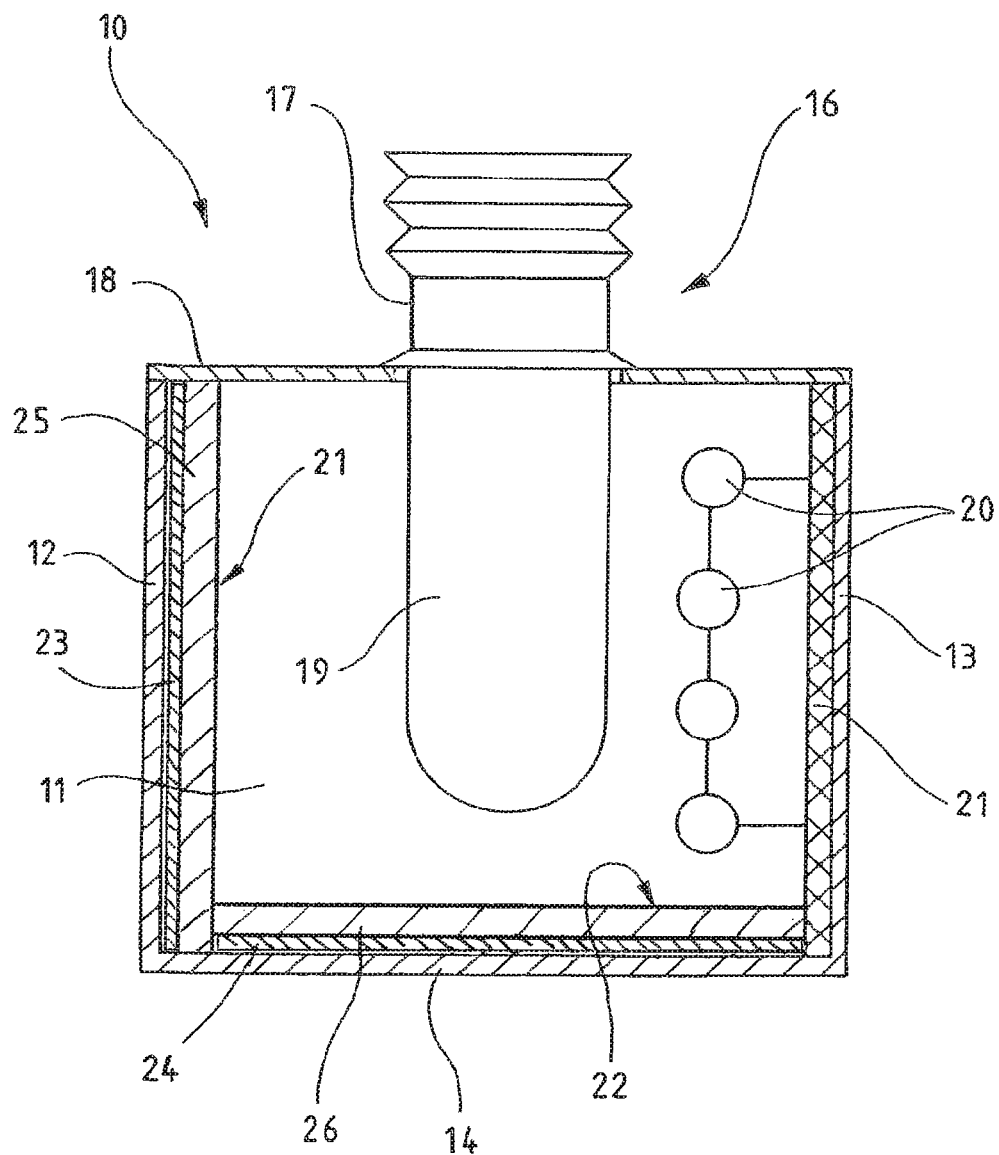
FIG. 2 shows a heating module according to a second embodiment of the invention.

FIG. 2 shows another exemplary embodiment of the invention with a heating channel 11 corresponding to the schematic structure previously described. The difference versus the exemplary embodiment shown in FIG. 1 pertains essentially to the nature of the reflector elements 21 and 22 serving as counter-reflector and base reflector, respectively.

Each of the reflector elements 21 and 22 comprises a quartz glass plate 25, 26, which serves as the carrier layer and which is coated with a silicon dioxide-containing reflective layer 23, 24. The reflective layers 23, 24 are applied to the quartz glass plates 25, 26 by a wet method, for example, and thus cannot be produced at all without a carrier layer. Of course, corresponding reflector elements consisting of coated carrier layers can also be realized with carrier layer materials other than quartz glass.

The reflector elements 21, 22 are arranged in such a way, for example, that the reflective layers 23, 24 are facing the interior of the heating channel 11, that is, facing the preforms 19 to be heated. This arrangement is also adapted to carrier layer materials which are impermeable in the infrared region.

The arrangement shown in FIG. 2, however, is especially advantageous; here the quartz glass plates 25, 26 of the reflector elements 21, 22 are facing the interior of the heating channel, which means that they are able to protect the reflective layers 23, 24 from dirt and damage. As a result, however, it is necessary to accept a slightly greater radiation loss through absorption in the material of the quartz glass plates; with respect to a viewpoint in the interior of the heating channel 11, this material is now in front of the reflective layer. This arrangement of the reflector elements 21, 22 is therefore appropriate only for carrier layer materials which have the lowest possible coefficient of absorption for infrared radiation.

The invention claimed is:

1. A device for heating preforms of thermoplastic material, comprising: a heating module that forms a heating channel through which parts of the preforms to be heated are conducted in sequence by a conveying device, wherein heating devices that emit infrared radiation are arranged on a side wall of the heating channel, and reflector elements are arranged in an area of a side wall opposite the heating devices and/or in area of a base of the heating channel to serve as a counter-reflector and a base reflector, which reflector elements ensure a lowest possible heat loss in the heating channel, wherein the reflector element serving to form the counter-reflector and/or base reflector has two layers, comprising a reflective layer and a carrier layer, wherein the reflective layer comprises a material based on silicon dioxide with an IR reflection value of greater than 90% in a range of 500-2500 nm, wherein carrier layer consists of a material with a mechanical strength greater than the mechanical strength of the reflective layer and is a support for the reflective layer, and wherein the two layers have similar coefficients of thermal expansion and are bonded permanently to each other.

2. The device according to claim 1, wherein the reflective layer comprises a silicon dioxide content of more than 95%.

3. The device according to claim 2, wherein the reflective layer comprises a silicon dioxide content of more than 99%.

4. The device according to claim 2, wherein the reflective layer is a two-dimensional molded part produced from amorphous silicon dioxide fibers.

5. The device according to claim 1, wherein the carrier layer is a two-dimensional molded part containing quartz glass, aluminum silicate, or calcium silicate.

6. The device according to claim 1, wherein the reflective layer is applied to the carrier layer by a wet method.

7. The device according to claim 6, wherein the reflective layer is applied to the carrier layer by spraying or dipping.

8. The device according to claim 1, wherein the two layers are bonded to each other by an adhesive or by lamination.

9. The device according to claim 1, wherein the reflective layer has a thickness that is no more than 50% of a thickness of the carrier layer.

10. The device according to claim 1, wherein at least one of the reflector elements is arranged so that the carrier layer of the reflector element faces the heating channel.

\* \* \* \* \*